United States Patent [19]
Garavuso et al.

[11] Patent Number: 5,858,048
[45] Date of Patent: Jan. 12, 1999

[54] ENERGY EFFICIENT, ELECTRIC ROTARY FURNACE FOR GLASS MOLDING (REPRESSING) PRECISION OPTICAL BLANKS

[76] Inventors: Gerald Garavuso, 14 Savannah Ct., Rochester, N.Y. 14625; Anthony J. Marino, 111 Frisbee Hill Rd., Hilton, N.Y. 14468; Dar Lyn Porchan, 5 Glenn Valley Dr., Penfield, N.Y. 14526

[21] Appl. No.: 805,593
[22] Filed: Feb. 25, 1997
[51] Int. Cl.$^6$ .................. C03B 40/027; C03B 23/00
[52] U.S. Cl. .................. 65/169; 65/268; 65/274; 65/275; 65/319; 432/122; 432/126; 432/234
[58] Field of Search .................. 65/169, 268, 274, 65/275, 319, 356; 373/27, 109, 113, 115; 432/122, 126, 234

[56] References Cited

U.S. PATENT DOCUMENTS

| | | | |
|---|---|---|---|
| 2,864,202 | 12/1958 | Haggerty et al. | 65/274 |
| 3,857,690 | 12/1974 | Zappia | 65/274 |
| 4,756,737 | 7/1988 | Yoshimura et al. | 65/275 |
| 4,836,838 | 6/1989 | Hirota et al. | 65/308 |
| 4,913,718 | 4/1990 | Yoshimura | 65/104 |
| 5,160,362 | 11/1992 | Yamamoto et al. | 65/102 |

Primary Examiner—Karen M. Hastings
Assistant Examiner—Sean Vincent

[57] ABSTRACT

A furnace for molding glass blanks includes a housing having a series of electrical heating stations and a rotary door adapted to receive glass blanks for processing. The furnace also includes a rotary turntable for receiving the glass blanks and a steering coil positioned to direct the glass blanks in a spiral pattern as they are heated at the electrical stations, a paddling platform for manual shaping, and a pressing station for pressing the glass blanks into a predetermined configuration.

17 Claims, 5 Drawing Sheets

A-A PRIOR ART

ENERGY EFFICIENT, ELECTRIC ROTARY FURNACE FOR GLASS MOLDING (REPRESSING) PRECISION OPTICAL BLANKS

BACKGROUND OF THE INVENTION

1. Field of the Invention

This invention relates to glass molding furnaces. Particularly, this invention relates to an electric glass molding furnace. More particularly, this invention relates to an efficient, rotary electric glass molding furnace.

2. Description of the Prior Art

Currently, glass molding furnaces are of the direct-gas type. These furnaces are inefficient for producing small quantities (less than 10,000) repressed glass blanks. These blanks are supplied to manufacturers of precision optics. The manufacturers supply any industry which produces assemblies which redirect light (i.e., medical, military, photography, communications, lasers, etc.). The furnaces used to create these blanks are energy inefficient, as well as, totally operator controlled and regulated with the training period of an operator being many years. Within the last two decades, the majority of companies producing molded glass blanks have traditionally scaled their manufacturing operations to large volumes and have used energy efficient, computer controlled in-line furnaces. Thus, there is a need to decrease furnace energy consumption, production lead time and cost when producing small quantities of repressed glass blanks.

SUMMARY OF THE INVENTION

Accordingly, it is a primary object of this invention to provide a new and improved furnace for efficiently glass molding small and large quantities of precision optical blanks.

It is a further object of this invention to provide a new and improved furnace that is easy to operate.

Additional objects and advantages of the invention will be set forth in part in the description which follows and a part will be obvious from the description, or may be learned by practice of the invention. The objects and advantages of the invention may be realized and attained by means of the instrumentality's and combinations particularly pointed out in the appended claims.

To achieve the foregoing objects and in accordance with the purpose of the invention, as embodied and broadly described herein, the furnace of this invention comprises a housing that includes a series of electrical heating stations and a rotary door adapted to receive glass blanks for processing. The furnace also includes a rotary turntable for receiving the glass blanks and a steering coil positioned to direct the glass blanks in a spiral pattern to keep them from sticking to the turntable as they are heated at the electrical stations, and a pressing station for pressing the glass blanks into a predetermined configuration.

BRIEF DESCRIPTION OF THE DRAWINGS

The invention consists in the novel parts, construction, arrangements, combinations and improvements shown as described. The accompanying drawings, which are incorporated in and constitute a part of the specification illustrate one embodiment of the invention and, together with the description, serve to explain the principles of the invention.

DETAILED DESCRIPTION OF THE INVENTION

Reference will now be made in detail to the present preferred embodiment of the invention, an example of which is illustrated in the accompanying drawings which are all shown in schematic form.

While the invention will be described in connection with a preferred embodiment, it will be understood that it is not intended to limit the invention to that embodiment. On the contrary, it is intended to cover all alternatives, modifications and equivalents as may be included within the spirit and scope of the invention defined by the appended claims.

Figure 1:
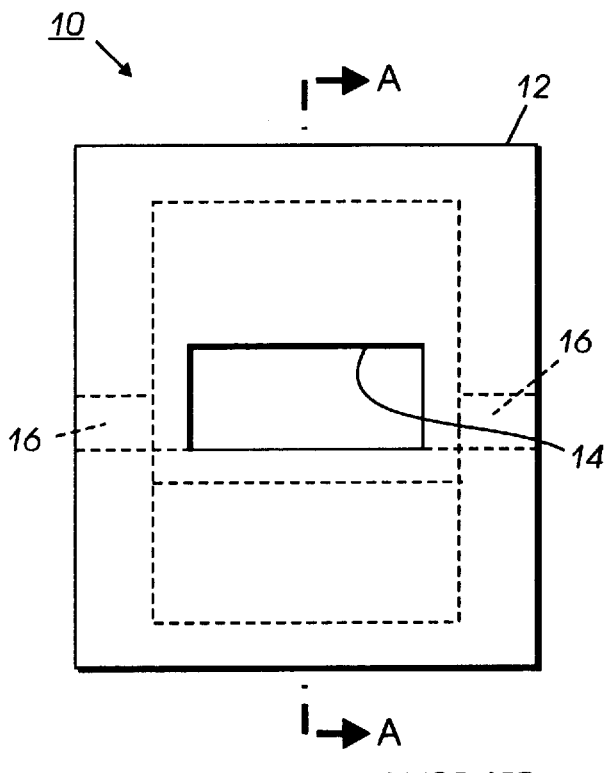
FIG. 1 is a front view of a conventional furnace for producing molded glass blanks.
Figure 2:
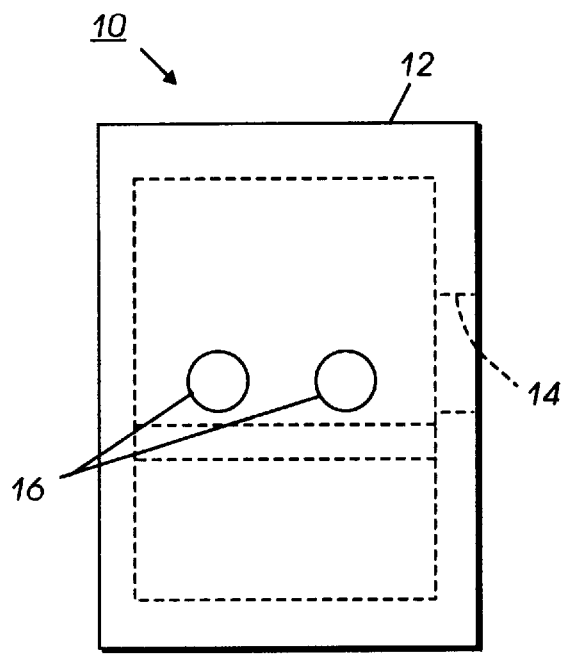
FIG. 2 is a left side view of the furnace of FIG. 1 showing gas jets in phantom.
Figure 3:
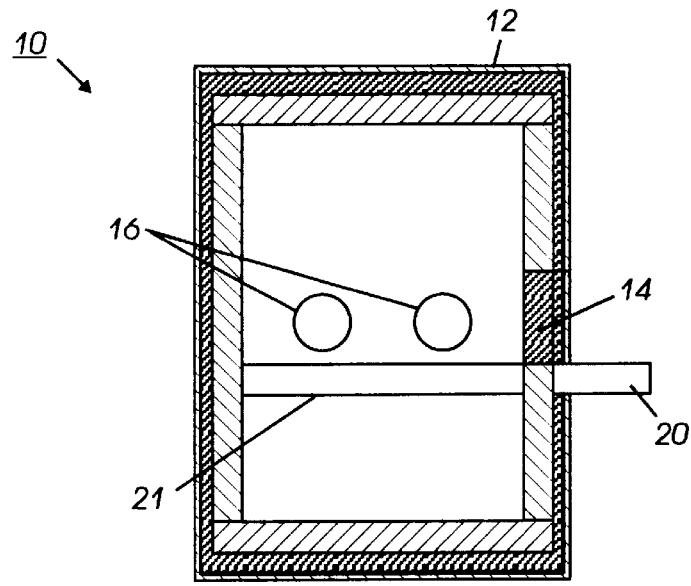
FIG. 3 is a front view of FIG. 1 taken along section line A—A 3—3 of FIG. 1.

Referring now to the drawings and FIG. 1, a diagram of the current conventional furnace design with refractory components is shown. As can be seen, this design is not optimized for energy efficiency, and especially with reference to making lots of glass blanks of 10,000 or less. As seen in FIGS. 1–3. This furnace design 10 is standard in the industry and includes a housing 12 with a glass blank access opening 14 positioned above a pre mold staging platform 20 from which glass blanks are directed onto hearth 21. The glass blanks are heated by direct gas jets 16. With this type of furnace, temperature variation are extreme within the furnace cavity. All control parameters are determined by the furnace operator and rely on operator skill at judging the softening of the glass for setting the amount of gas supplied to the furnace. Since there are currently over one thousand different types of glass with individual softening temperatures, the current furnace design necessitates that the operator be extremely well trained. Rather than having production protocol, the operators become master craftsmen capable of judging when a quenching bath is necessary or additional heat screens or numerous other minor modifications that are standardized. Even with a very talented operator, molding problems, such as, cracking, wedging and folds occur routinely.

Attempts at modifying the gas furnaces types of FIG. 1 have been made and engineering prototypes have been constructed whereby the gas jets are placed beneath the hearth plate to allow the plate to act as a heat ballast. The concept has been used at other manufacturing sites for larger furnaces. When applied to this furnace, the time to reach operating temperature was excessive in terms of maintaining daily production. In subsequent modifications, indirect heating hampered the furnace operator by eliminating the ability to see the gas flame. This parameter is fundamental to a skilled molder who uses that empirical visual data to control and set the temperature of a furnace. Gas usage actually increases since the temperature of the furnaces were raised to decrease the wait-time required to reach the temperatures. This created a rebound effect since the hearth plate (acting as a heat ballast) would shortly become too hot to use without material failures.

Figure 4:
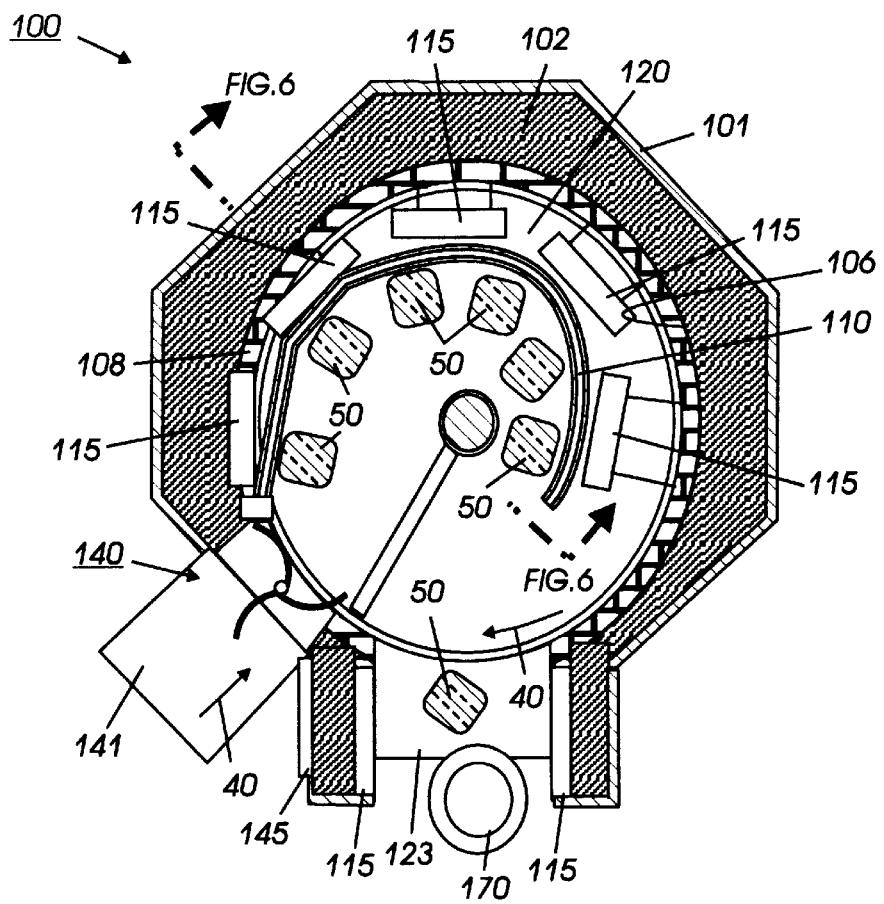
FIG. 4 is a plan view of the improved furnace of the present invention.
Figure 5:
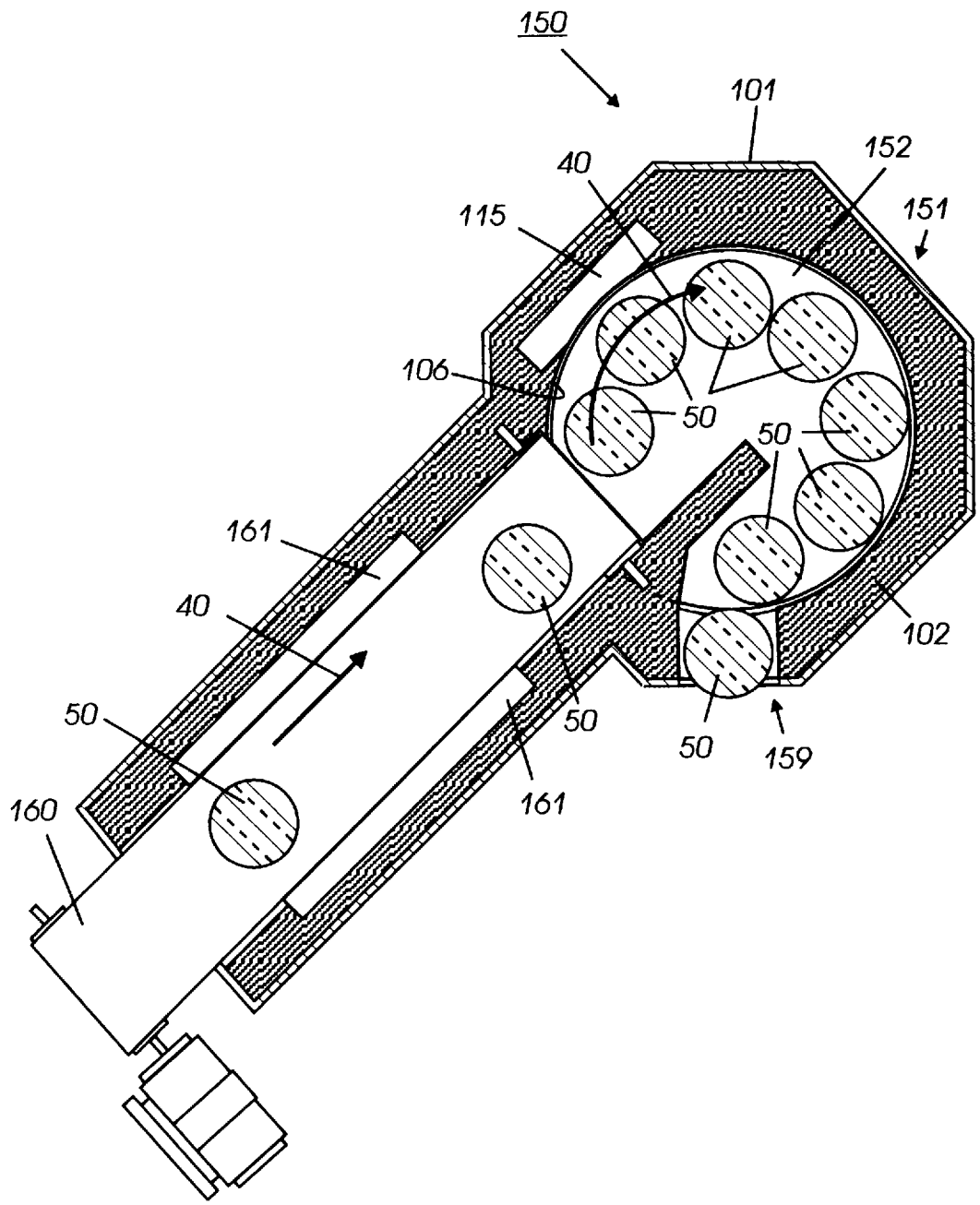
FIG. 5 is a plan view of a system for handling molded blanks after they exit the furnace.
Figure 6:
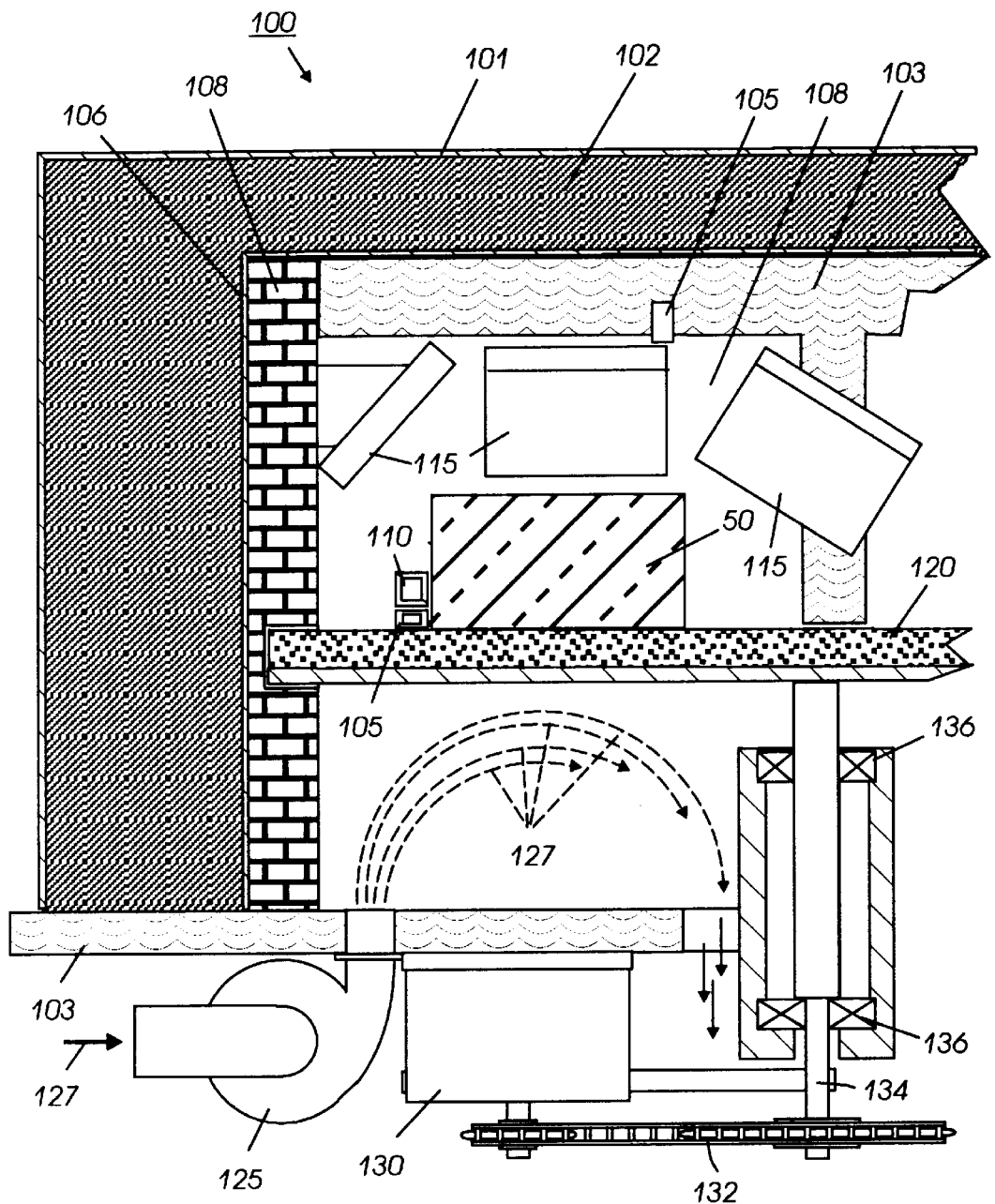
FIG. 6 is a partial elevational view of the furnace of FIG. 4 taken along section lines 6—6 of FIG.4.

Now turning to the furnace of the present invention, an electric rotary furnace 100 is shown in FIGS. 4–6 that decreases energy consumption, production lead time and cost over furnaces of the type shown in FIG. 1. Rotary electric furnace 100 comprises a brushed heavy sheet steel shell 101 backed by kaowool HS45 insulation 102 which in turn is fronted by heavy duty reflective aluminum foil 106 for internal heat reflection. As shown in FIG. 6, shell 101 at its base is supported on 103 which is a Pyro-Bloc 4 module lining. Adjacent side walls of shell 101 is insulation 102 and fire brick 108. Cooling air flow in the direction of arrow 127 through holes in support 103 results from operating stainless steel fan 125. Air is used to cool the turntable so that the molten glass will not adhere to it. Glass blanks are moved via the turntable from one heater to another. Heater temperatures are individually controlled to raise the glass temperature at a rate which avoids problems of creaking and crazing. Glass blanks 50 are guided past a series of electric heaters 115 by steering coil 110 which can be hollow steel and water or air cooled to avoid material failure or adhesion of the glass blanks to the steering coil. The hollow steering coil 110 is used to slide the glass blanks on the turntable surface to avoid adhesion of the molten glass. Glass blanks 50 are shown positioned on rotatable turntable 120 which comprises a steel substrate below a plurality of various ceramic hearth plates. Furnace cavity temperature is monitored by thermocouples 105 positioned in predetermined strategical locations within the cavity, e.g., in the outer surface of Pryo-Bloc 4 member 103 and along steering coil 110.

Turntable 120, as shown in FIG. 6, is rotated in a clockwise direction by motor 130 through direct chain drive 132 and spindle 134 that is mounted with bearings 136. As seen in FIG. 4, glass blanks 50 are fed onto turntable 120 through a revolving door 140 in the direction of arrow 40 by a part feeder 141 which could be a conventional conveyor belt or a staging platform where the blanks are fed by an operator manually. Constant feeding of the glass blanks eliminates the potential for two blanks to make contact with each other which would result in sticking and waste. At the exit of furnace 100 is a pressing station 170 for pressing the molding glass blanks into a desired configuration manually by an operator. En route to pressing station 170, glass blanks 50 are conveyed on paddling platform 123 past platform and mold heaters 115 on either side of the platform 123 where they can be manually shaped, if necessary, before reaching the mold at pressing station 170. It should be understood that a door could be added which opens automatically to allow removal of the heated glass further reducing heat losses at the point where the heated glass approaches pressing station 170.

Figure 7:
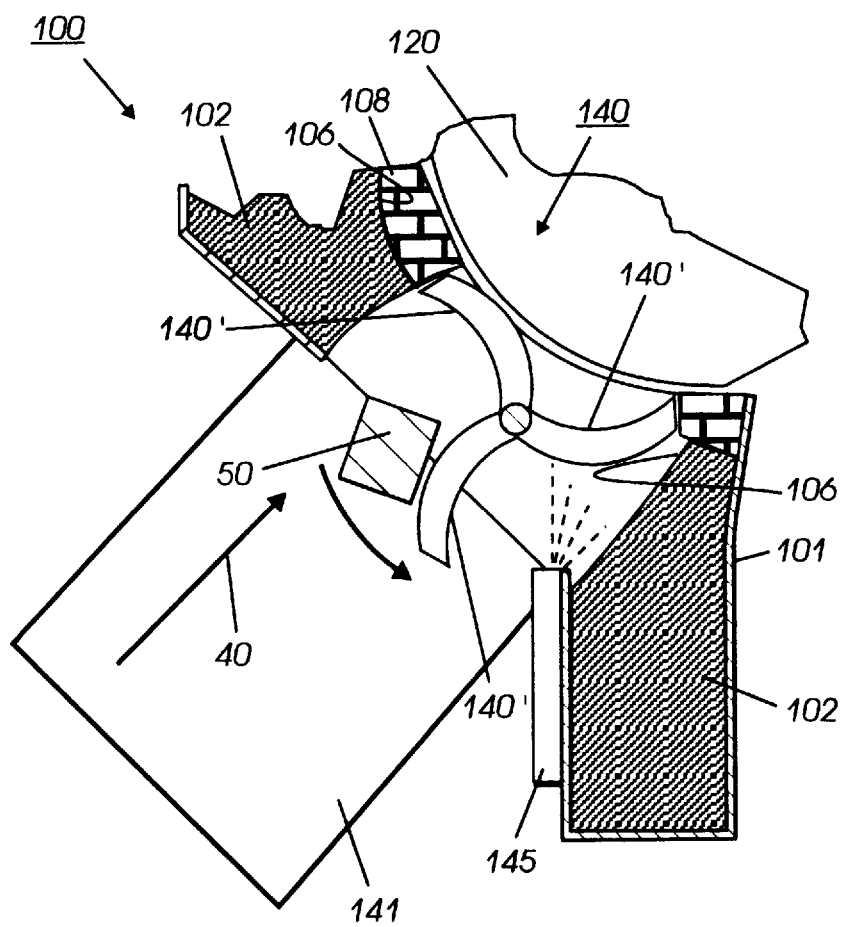
FIG. 7 is an exploded partial plan detail of the entrance area of the furnace of FIG. 1.

In FIG. 5, a post pressing apparatus 150 is shown that comprises a housing 151 that includes a brushed stainless shell 101 and a conveyor 160 that conveys glass blanks 50 in the direction of arrow 40 into housing 151 past postheater 161 on rotary postheater turntable 152 which rotates the blanks for exiting therefrom at exit area 159. While one postheater 116 is shown, it is within the scope of the present invention to include a single or plural postheaters that are individually controllable to manage the optimum cooling profile. In FIG. 7, entrance of glass blanks into the cavity of furnace 100 is shown as including a part feeder 141 which could be a conveyor that feeds a glass blank 50 into conventionally driven rotating steel door 140 to be driven into the furnace. Steel door 140 has curved spokes 140' that contact the glass blanks and drive them into the furnace cavity. An oil/graphite sprayer 145 is positioned to spray the surface on which the glass will slide thereby providing a lubricant to the bottom of the glass which will reduce the tendency for the glass to adhere to the turntable after the glass softens.

For glass repressing, energy consumption and the efficiency of the furnace becomes a significant cost factor. Gas fueled furnaces as shown in FIG. 1 are less than 5% efficient. By changing over to an electrical furnace as shown in FIGS. 4–7, this efficiency approaches 90% and no exhaust gas is removed from the furnace and other convection losses are restricted. This provides several key advantages: accurate temperature sensing and control; elimination of air currents caused by gas combustion and open-air convection; and the recycling of heated air through conveyor heaters and postheaters. With part feeder 141 and rotating door 140, glass entering the furnace does not open a pathway for air convection and the temperature in that loading area is moderated. This reduces the extremes in temperatures that are seen in the conventional furnace design and addresses the inefficiencies caused by large temperature differences. This same principle could be used at the point of exit from the furnace where the parts are sent through a postheater turntable which isolates the area where temperature differentials will affect air convection. With process controls, the energy consumption and combustion exhaust is further reduced and constant "holding" temperatures are maintained rather than doing a cold start every day. It should be understood that the electrical rotary furnace system of the present invention will increase the efficiency of any process that requires heating glass in order to reshape it, e.g., test laboratories in optical engineering programs in universities, research laboratories studying optical properties, and prototype precision optical manufacturers.

The electric rotary furnace of the present invention has several advantages over conventional furnaces. For example, by controlling the heating profile in time, the temperature at the center of the glass can be raised to the molding temperature without over heating the furnace thereby reducing slump and adhesion of the glass to the hearth plate. Since the temperature within the furnace cavity will fluctuate less than currently happens in the gas fired furnaces, the temperatures can be set to the published values for the softening range for each glass. This will save energy, reduce the temperatures that the operator is exposed to and should help reduce the adhesion problems currently associated with excess molding temperatures. Also, in current furnaces, heated air produced by combustion is lost through openings including the front one where the operator inserts and removes glass blanks. The introduction of glass blanks via rotary door 140 limits the heat loss via air currents. An additional savings in air flow will occur since the opening where the operator paddles and removes the blanks will be smaller than in current furnaces. Additionally, in a direct-gas furnace, glass pieces are placed within a furnace cavity, allowed to warm to the softening temperature and then paddled into the shape required to fill a tooled mold for final pressing into the required geometry. An advantage of the rotary furnace of the present invention is that there is a constant feed for new glass pieces. This will increase the number of blanks that can be generated per working day, thus a direct energy savings per unit piece. Further, currently, prewarming of the glass is done within the furnace. This is very energy inefficient since the temperature is set for reaching the softening stage as quickly as possible to increase production. By having the prewarming done as a part of the rotation, convection currents will carry the heat from the hotter area where the operator will remove the glass piece for final pressing. This will reduce the energy usage as compared to the direct-gas furnace. Further yet, in existing ovens, the majority of the heat energy is being lost to the outside environment. The operator exists in that environment. The elimination of heated gas and subsequent decrease in air flow combined with an electric furnace with superior insulation properties, will mean that the operator will be exposed to lower temperatures. In addition, the production areas will require less air-conditioning which will result in lower overall energy consumption. Also, in current direct-gas furnaces, release powder must be used for certain types of glasses to prevent adhesion to the hearth plate. This sticking occurs when the glass begins to flow. The surface tension of the softening glass is higher than the surface tension of the hearth plate and wetting occurs. In the electric furnace 100, the powder will not be blown into the environment by air convection forces.

It should now be understood that an improved small furnace with a decreased energy consumption on a per unit produced basis has been provided and, in accordance with the invention, includes a method and apparatus for mounting glass blanks on a rotary turntable that conveys the glass blanks past several electric heaters that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Having thus described the invention, it is claimed:

1. A furnace for producing repressed glass blanks, comprising:
    a housing for holding a plurality of glass blanks for molding purposes;
    a series of electric heaters within said housing for heating said plurality of glass blanks, said series of electric heaters being adapted to heat said plurality of glass blanks to progressively higher temperatures as said plurality of glass blanks pass each of said series of electric heaters; and
    a rotatable turntable for supporting and rotating the glass blanks past said electrical heaters, and wherein said housing includes an entrance for insertion of glass blanks into said housing, and wherein said housing includes a rotary door positioned within said entrance of said housing.

2. The furnace of claim 1, wherein said rotary door includes a series of solid partitions which substantially block heat flow from interior portions of said housing of the furnace.

3. The furnace of claim 2, wherein rotation of said series of spokes of said rotary door moves the glass blanks from outside said housing onto said turntable positioned within a cavity portion of said housing.

4. The furnace of claim 3, including a part feeder for feeding glass blanks into said rotary door.

5. The furnace of claim 4, wherein said spokes have a curved glass blank contacting surface.

6. The furnace of claim 5, including an oil/graphite sprayer positioned adjacent said rotary door.

7. A furnace for producing repressed glass blanks, comprising:
    a housing for holding a plurality of glass blanks for molding purposes;
    a series of electric heaters within said housing for heating said plurality of glass blanks, said series of electric heaters being adapted to heat said plurality of glass blanks to progressively higher temperatures as said plurality of glass blanks pass each of said series of electric heaters;
    a rotatable turntable for supporting and rotating the glass blanks past said electrical heaters; and
    a steering coil for steering the glass blanks in a predetermined direction as they are rotated on said turntable.

8. The furnace of claim 7, including a pressing station for molding the glass blanks into a desired configuration.

9. A furnace adapted to soften glass blanks, comprising:
    a housing;
    a rotary door included in said housing and adapted to allow glass blanks to be placed within said housing;
    a series of electrical heating stations positioned within said housing;
    a rotary turntable adapted to receive the glass blanks placed within said housing;
    a steering coil positioned to direct the glass blanks in a spiral pattern as they are heated at said electrical stations; and
    a pressing station for receiving the glass blanks from said turntable and pressing them into a predetermined configuration.

10. The furnace of claim 9, wherein said rotary door includes a series of spokes.

11. The furnace of claim 10, wherein rotation of said series of spokes of said rotary door moves the glass blanks from outside said housing onto said turntable positioned within a cavity portion of said housing.

12. The furnace of claim 11, including a part feeder for feeding glass blanks into said rotary door.

13. The furnace of claim 12, wherein said spokes have a curved glass blank contacting surface.

14. A system for molding glass blanks into a desired configuration, comprising:
    a furnace for heating glass blanks to a softening point, said furnace including an ingress area and an egress area, a first turntable for rotatable supporting glass blanks, a plurality of electric heaters positioned at predetermined positions adjacent said turntable for heating the glass blanks to progressively higher temperatures, and a pressing station positioned opposite said egress area for pressing the glass blanks into a predetermined shape;
    a glass blank transport for transporting the glass blanks after they have been pressed;
    a transport heater for controlling the cooling rate of the glass blanks while they are being conveyed by said transport;
    a second turntable for receiving the glass blanks from said glass blank transport;
    a heater for controlling the cooling rate of the glass blanks while they are on said second turntable; and
    a revolving door positioned in said ingress area of said furnace for allowing ingress of the glass blanks into said furnace.

15. The system of claim 14, including a steering coil for steering the glass blanks around said first turntable.

16. The system of claim 15, including temperature control means for controlling the temperature of said steering coil to avoid adhesion of glass blanks thereto.

17. The system of claim 16 wherein said steering coil is hollow and water or air cooled.

* * * * *